Patented Jan. 16, 1923.

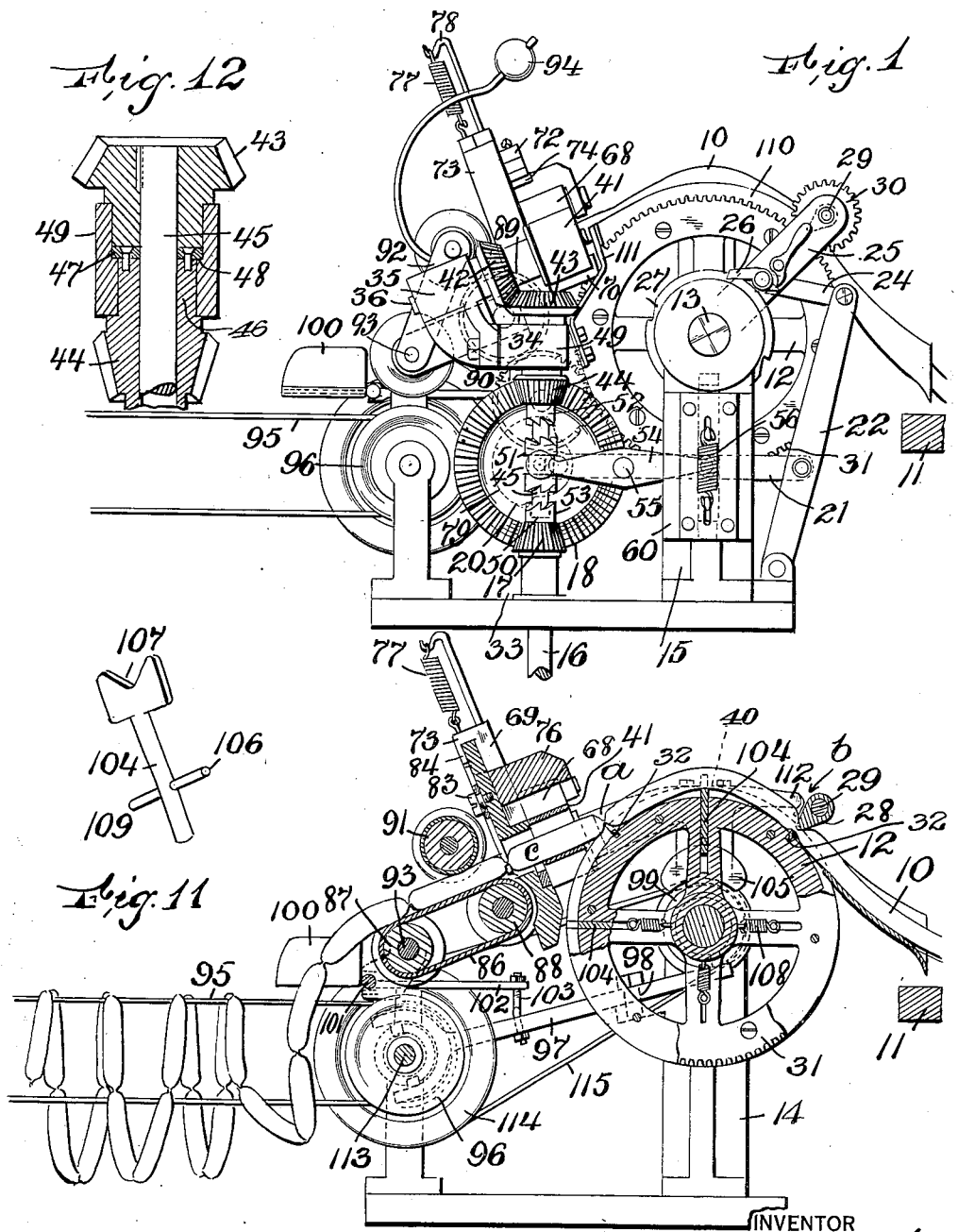

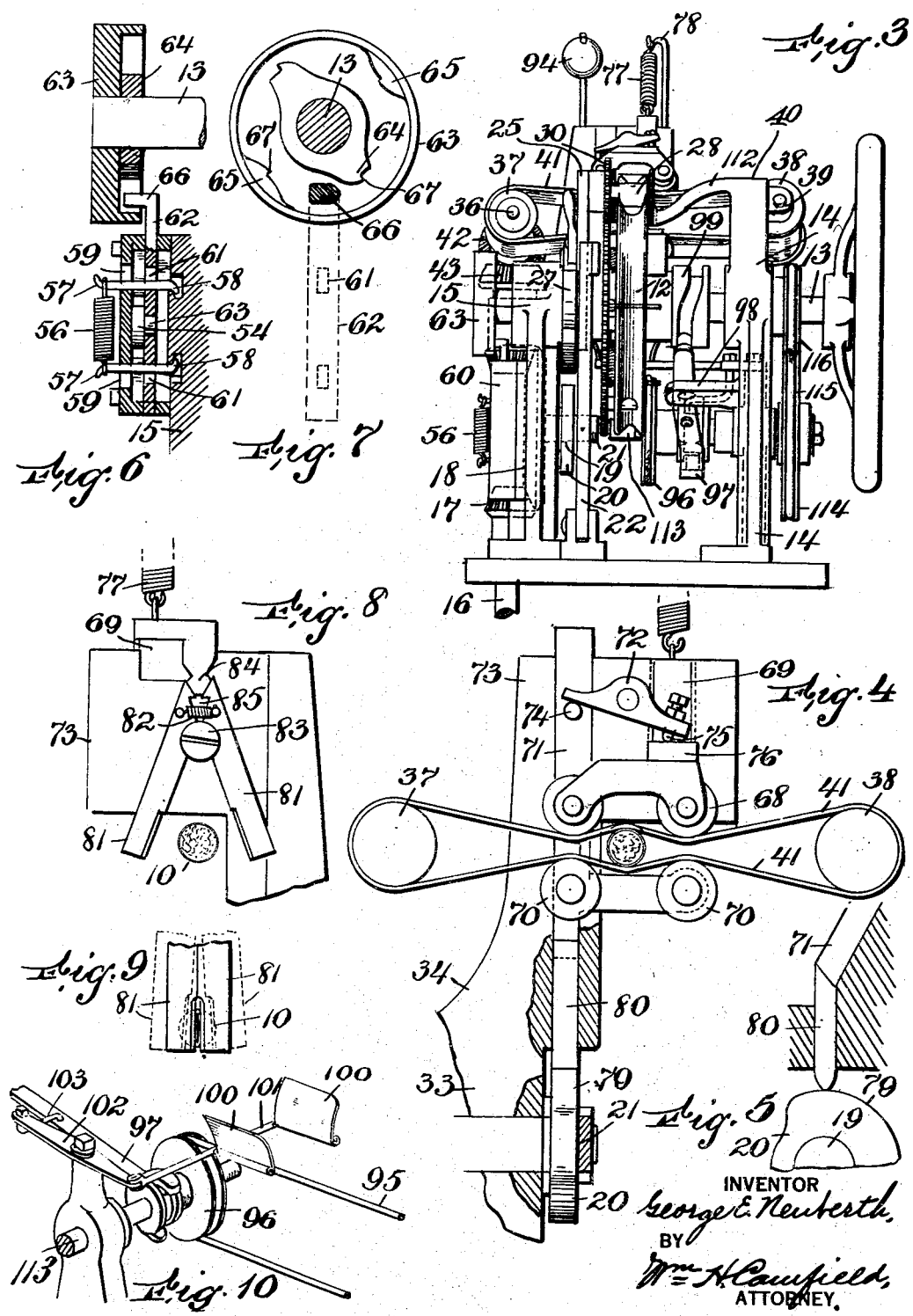

1,442,232

UNITED STATES PATENT OFFICE.

GEORGE E. NEUBERTH, OF NEWARK, NEW JERSEY, ASSIGNOR, BY MESNE ASSIGNMENTS, TO PACKERS' EQUIPMENT CO., A CORPORATION OF NEW JERSEY.

MACHINE FOR FORMING SAUSAGE INTO LINKS.

Application filed April 12, 1922. Serial No. 551,856.

*To all whom it may concern:*

Be it known that I, GEORGE E. NEUBERTH, a citizen of the United States, and a resident of Newark, county of Essex, and State of New Jersey, have invented certain new and useful Improvements in Machines for Forming Sausage into Links, of which the following is a specification.

This invention relates to a machine which twists sausage into links by means of a belt, the reaches of the belt being pressed in contact with a length of sausage, said machine squeezing the sausage at spaced intervals to define the limits of the links, such squeezing forcing the filling out of the casing at these squeezed points, so that the casing is twisted where it has no filling and forms an easy severable connection between links.

The invention also relates to a machine in which the feeding is done in a manner to provide an excess length of sausage to the twisting means, so that there is no excess tension on the casing of the sausage when the twisting takes place, since at each predetermined length of sausage the slight increase in diameter, due to the squeezing, is localized in each length of sausage and there is not an accumulation of material squeezed backward toward the end of the sausage, which in previous machines has caused the tearing apart and severing, before many links have been made, of a length of sausage.

The invention also relates to a machine which feeds the length of two links at a time, squeezes this two-link length at its ends, feeds this material forward, squeezes between the aforesaid squeezed portions to divide the two-link length into individual links, feeds this material forward by a step-by-step motion and then twists every other link, each twisting being in a direction reverse to the previous one.

The invention is also designed to provide a machine in which the string of links is fed to a conducting belt, the parts being so disposed that the links are fed first to one side and then to the other of the conducting belt, which belt operates relatively slowly, which relation of the string of links is convenient for lifting the links on sticks used in smoking or to conduct the links on the belt through a smoking apparatus.

The invention also resides in certain details of construction to be hereinafter more fully described and finally embodied in the claims.

The invention is illustrated in the accompanying drawings, in which Figure 1 is a side view of the machine. Figure 2 is a sectional detail, through the center, of the machine, illustrating part of the feeding wheel and the conducting means in elevation. Figure 3 is a back view of the machine. Figure 4 is a detail view showing one means for forcing the belt in contact with the sausage to twist it into links. Figure 5 is a detail sectional view of the lower part of Figure 4 at a right angle thereto. Figure 6 is a vertical section of part of the reversing mechanism. Figure 7 is a face view of a cam which is a part of said mechanism. Figure 8 is a face view of the intermediate squeezing means. Figure 9 is a similar view of the lower or squeezing part thereof in closed position. Figure 10 is a detail perspective view of a means for shifting the conducting belt. Figure 11 is a perspective view of one of a set of risers placed in the feeding wheel, and Figure 12 is a detail section of a gear connection in the machine.

The sausage 10, which is in long lengths and is taken from the filling machine which places the filling in the casing and which distends the casing and gives it a substantially equal diameter throughout, is usually fed from a suitable table or platform 11 and is taken up by the feeding means, which in the form shown consists of a wheel 12 which has its periphery arranged so that it receives the sausage, a grooved wheel being usually employed for this purpose. The feed wheel 12 is mounted on a shaft 13 rotating in bearings 14 and 15 and operates by a step-by-step motion to feed a predetermined length of sausage forward at regular intervals, the feed wheel being operated from the main shaft 16, which main shaft has a bevel gear 17 in mesh with the larger bevel gear 18, which bevel gear 18 is mounted on a shaft 19 (Figure 3), on which is arranged a cam 20, the cam surface of which is utilized for an operation to be described hereinafter, but which, at its interior portion, acts as a crank for the arm 21 which swings the lever 22, which is connected by a link 24 with the arm 25, which is thus oscillated and has a pawl 26 which engages the ratchet 27, so that when the arm swings forward the feed wheel 12 is fed forward, and when the arm 25 returns, the feed wheel remains stationary.

The feed wheel is usually arranged to feed a length of sausage forward that will be equivalent in length to two links, and I show, for the purpose of clear description, a feed wheel that in four feedings makes a complete revolution and therefore feeds sausage of a length to be formed into eight links.

The extremities of these two links are squeezed by the feeding means, such squeezing means on the feeding means comprising a finger 28 on the shaft 29, to which is also secured the pinion 30 which is in mesh with a gear 31 on the feeding wheel, and at spaced intervals on the periphery of the wheel are the small blocks 32, so that when the arm 25 swings back, the reverse rotation of the pinion 30 carries the finger 28 backward over the sausage and it rotates into position to squeeze the sausage shown in Figure 2 on its rearward limit of movement, and then when the arm 25 is swung forward, the gear 30 does not rotate because the gear and the pinion move forward together and positively feed the length of sausage between the previously squeezed point at $a$ in Figure 2 and the squeezed point shown at $b$ in Figure 2.

The standard 33 acts as a support for the shaft 19, and has a supporting frame 34, at one end of which is the bearing 35 for supporting the shaft 36, which at one end supports a pulley 37, a complementary pulley 38 (see Figure 3) being mounted in a bearing 39 in an extension arm 40 in the top of the bearing 14. This construction is one means for supporting a belt 41, which can be yieldingly held so that it can have its reaches forced into engagement with the sausage to twist it.

I prefer to use a single belt 41 and make it of elastic, such as rubber, so that it can be easily washed and cleaned and permits the sausage to slide easily through it when it is being fed if it should, by chance, engage the belt while being fed. The belt is driven by at least one of the pulleys being positively rotated, and in the form shown the pulley 37 is operated by bevel gears 42 and 43 and is driven from the main shaft 16, and the machine illustrated shows means for driving the belt first in one direction in one twisting operation, and then in the reverse direction in the next twisting operation. To bring this about I place a bevel pinion 44 in mesh with the bevel gear 18, and, as will be seen from Figure 12, this is fixedly secured to the jack shaft 45 which passes through the sleeve 46 of the gear 44, the sleeve 46 being held up by such means as the washer 47 ing operated in unison by means of a rock-engaging the shoulder 48 on the inside of the bearing 49 on the frame 34.

The jack shaft 45 extends down and has its end 50 loosely rotatable in a socket on the gear 17, and a sliding clutch member 51 rotates constantly with the jack shaft 45 and has teeth so that it can be alternately thrown in mesh with the clutch members 52 and 53 on the gears 44 and 17, respectively. The arm 54 engages the sliding clutch member to move it, and it is pivoted at 55 on an extension of the bearing or standard 15, and is normally held in neutral position by the influence of the spring 56 which engages the two small arms 57 which have their inner ends 58 caught into the recesses in the bearing 15 to pass through the slots 59 in the casing 60, which limits their inward movement, and also through the slots 61 in the slide 62.

It will thus be noted that since the slide is connected pivotally, as at 63, with the inner end of the arm 54, the sliding clutch member is held in neutral position. When the slide 62 is pushed down, the lower finger 57 is pushed down, the upper finger 57 acting as an abutment for holding the spring, and when the slide 62 is pushed upward from its neutral position, the upper finger 57 can swing against the influence of the spring 56, and the slide 62 is operated by the cam 63, being pushed down by the cam element 64 and being pushed up by the cam element 65, these being four in number in a machine such as this, where four movements of the feed wheel complete a rotation, the cam stopping each time in engagement with the nose or projection 66 on the slide 62, each of the cam elements 64 and 65 having a shoulder 67 which acts as a lock to prevent reverse rotation of the feed wheel, since the cam 63 securely fastens the shaft 13 on which the feed wheel is located.

The parts are so synchronized that when the feed wheel is being rotated forward to feed sausage, the cam is rotating as shown in Figure 7, the slide 62 is in neutral position and the jack shaft 45 is not rotated and the belt 41 is at rest. On the reverse movement of the arm 25 to grasp a new length of sausage to be fed, the arm 54 has been swung by the cam 63 either up or down, and through the clutch the jack shaft 45 is operatively connected, since the sliding clutch member 51 is on a feather or other means for securing it to the shaft, so that they rotate together, and the belt, through the above described mechanism, is operated. When the belt is moved to twist the sausage into a link, it is pressed against the sausage by means of upper pressure pulleys 68 mounted on a slide 69, and lower pressure pulleys 70 mounted on a slide 71, these being lever 72 pivoted on the bracket 73 which extends up from and is part of the standard 33, so that when the lower pulleys 70 and their slide are pushed up, the upper pulleys 68 and their slide are pushed down, since the pin 74 engages one end of the rocking lever 72, and the adjustable element, such as the screw 75, bears on the top of the bracket 76 of the slide 69 of the upper pulleys, these parts being normally held out of pressing engagement by the spring 77 which is fastened at the top to the slide 69 and is caught at its other end over the hooks 7.

These slides are put in position to press the belt against the sausage by a cam 79 which engages the pin 80 (see Figures 4 and 5) which rests against the bottom end of the slide 71, which cam face 79 is on the element 20 which acts as a crank for the arm 21.

On the back face of the bracket 73 is a squeezing mechanism consisting of two jaws 81 which are normally held apart by reason of the spring 82 engaging them above their pivot 83, and the wedge 84 is forced down between the upper ends of the jaws to squeeze them together at their bottom ends, as shown in Figure 9, to force the filling from between the casing at this point. The wedge 84, however, after it has squeezed the jaws to their limit of movement, rides down in the recess 85 and permits a slight relaxation of the pressure of the jaws on the casing, as shown in dotted outline in Figure 9, so that when the twisting takes place, the point at a, Figure 2, and the point c in the same figure, which have been squeezed as just described, are free to be easily rotated to twist the casing at these points, as these squeezed parts are now released and they hold their shape in squeezed form so that this twisting is easy and there is no outside friction on the casing to sever it.

When the sausage is fed, and after it has passed through the twisting means, it is conducted by a short belt 86, preferably made of rubber, which rotates with the pulleys 87 and 88, the pulley 88 being driven by means of the gear 89 and the gear 90 from the gear 31 on the feed wheel 12. This feeding is insured by the loose pulley 91, preferably with a rubber facing, and which is at the end of the link 92 pivoted at one end to the shaft 93, on which the pulley 87 rotates, and held down with sufficient pressure to insure the feeding under the influence of the weight 94.

The links are deposited in any desired receptacle, but I prefer to loop them on opposite sides of the upper reach of the conducting belt 95 which is driven preferably from the shaft 113 by the belt 115 passing over the pulleys 114 and 116, the conducting belt passing over the pulley 96 which is sildable transversely (see Figure 10) and is slid by reason of the lever 97, pivoted at 98, being swung by the cam 99 (see Figure 3). This cam is disposed so that four links, for instance, are deposited on one side of the conducting belt, and then the belt is shifted so that the links descend on the other side, and the arrangement of the links on the conducting belt is as shown in Figure 2.

To insure the sausage passing over to the other side I provide a pair of shields 100 on a bar 101 connected to a lever 102, which on its rear end has a connection 103 with the lever 97, so that the links, when they descend and are to be shifted to the other side of the belt, are positively moved gently over to the side opposite the direction from which the conducting belt has been shifted.

In these machines as heretofore made, a successive twisting of one link after another has caused an accumulation of strain on each succeeding link, so that the casing eventually breaks, and I avoid this difficulty by providing an excess length of sausage in the feeding means between the initial squeezing or spacing of the links, and the form shown comprises a set of risers 104 which, as will be seen from Figures 1, 2 and 3, are pushed out readily by the cam 105 engaging a pin 106 on a riser and causing the sausage to be arched on a smaller radius than the radius of the wheel, so as to provide a hump or a little excess material in that part that is being fed, so that when it again straightens out there is sufficient excess casing provided to allow for the twisting, the material, of course, being taken care of by the stretching quality or the slight give laterally of the casing of the sausage. The risers are normally held inwardly, that is, with their outside edges 107 flush with or slightly below the periphery of the feeding wheel, by the springs 108 fastened at one end to the pins 109 of the risers, and at the other end to the hub of the feeding wheel.

To prevent lateral movement of the sausage from the feeding wheel I provide shields 110, one on one side being supported by the bracket 111, and that on the other side by the arm 112 secured to the top of the bearing or standard 14.

It will be evident that the details can be varied and the parts can be assembled in different relations without departing from the scope of the invention.

I claim:

1. A machine for forming sausage into links comprising an elastic belt, pulleys for rotating the belt, means for feeding the sausage between the reaches of the belt, and means for pressing said reaches in contact with the sausage.

2. A machine for forming sausage into links comprising an elastic belt, means for operating the belt, means for placing the sausage between the reaches of the belt, and means for causing said reaches to engage the sausage to rotate it.

3. A machine for forming sausage into links comprising a belt, a step-by-step means for feeding sausage between the reaches of the belt, and means for causing said belt to engage the sausage while the feeding means is halted.

4. A machine for forming sausage into links comprising a belt, means for supporting the belt, means for feeding sausage between the reaches of the belt, mechanism for alternately operating the feeding means and the belt, and means for pressing the reaches of the belt into engagement with the sausage when the belt is operated.

5. A machine for forming sausage into links comprising a belt rotatably supported with its reaches separated, means for pressing said reaches toward each other at intervals, and means for feeding sausage between said reaches.

6. A machine for forming sausage into links comprising a belt, pulleys on which the belt is mounted, means for rotating at least one of the pulleys first in one direction and then reversed, means for intermittently operating said rotating means, means for feeding sausage between the reaches of the belt in the intervals when the belt is at rest, and means for pressing the belt against the sausage when the feeding means is stopped.

7. A machine for forming sausage into links comprising a means for engaging and twisting the sausage, means for squeezing the sausage to space the outer ends of two adjoining links, means for feeding sausage so squeezed into the twisting means, an additional squeezing means for spacing the links between said ends, and mechanism for releasing said last mentioned squeezing means and operating the twisting means.

8. A machine for forming sausage into links comprising a means for feeding sausage, means for squeezing the sausage to space it into links, a means for twisting the sausage so spaced to form links, said squeezing means being released before the twisting means operates.

9. A machine for forming sausage into links comprising a feeding means for the sausage, means for squeezing the sausage to define alternate points of twisting, means for engaging the sausage to twist it, mechanism for operating said twisting means first in one direction and then in the reverse direction, squeezing means for defining the other alternate points of twisting, and a step-by-step mechanism for feeding the sausage a distance equal to the space between the first mentioned points of squeezing.

10. A machine for forming sausage into links comprising a twisting means, a means for feeding sausage through the twisting means, means for squeezing the sausage at double intervals before it reaches the twisting means, the parts being disposed so that the twisting means engages the rear half of the sausage between said intervals, means for squeezing and releasing the sausage equi-distant between said intervals, and means for operating the twisting means immediately after said last mentioned squeezing takes place.

11. A machine for forming sausage into links comprising a twisting means, a means for feeding sausage through the twisting means, means for squeezing the sausage at double intervals before it reaches the twisting means, the parts being disposed so that the twisting means engages the rear half of the sausage between said intervals, means for squeezing and releasing the sausage equi-distant between said intervals, means for operating the twisting means immediately after said last mentioned squeezing takes place, and means for reversing the twisting means at each operation thereof.

12. A machine for forming sausage into links comprising a twisting means, a feeding means for conducting sausage to said twisting means, a squeezing device in said feeding means for spacing the sausage into links, and means in said feeding means for arching said sausage when squeezed so as to prevent excess tension on the casing of the sausage in the subsequent twisting.

13. A machine for forming sausage into links comprising a twisting means, holding means for supporting sausage substantially straight in the twisting means, and a means for feeding and squeezing the sausage in arched form previous to entering said twisting means, whereby the sausage when twisted is relieved of excess tension on the casing.

14. In a machine for forming sausage into links, a twisting means, a conducting belt to receive the links from the twisting means, and mechanism for moving the conducting belt from side to side to suspend the links first on one side and then on the other.

15. In a machine for forming sausage into links, a twisting means, a conducting belt to receive link sausage from said means, guide plates between which the links pass, and means for moving the guide plates and the conducting belt in opposite directions at intervals.

16. In a machine for forming sausage into links, a feeding wheel having its periphery adapted to feed sausage, and spaced means on said periphery for causing sausage on the periphery to be arched at a smaller radius than that of the periphery.

17. In a machine for forming sausage into links, a feeding wheel having its periphery adapted to feed sausage, spaced means on said periphery for causing sausage on the periphery to be arched at a smaller radius than that of the periphery, and squeezng means on the wheel and between the arching means.

18. In a machine for forming sausage into links, a feeding wheel, a gear on the feeding wheel, a ratchet on the feeding wheel, an arm swinging relative to the wheel, a pawl on the arm and in engagement with the ratchet, a pinion on the arm in mesh with the gear, a finger on the pinion to squeeze material against the periphery, and means for oscillating the arm.

In testimony that I claim the foregoing, I have hereto set my hand, this 11th day of April, 1922.

GEORGE E. NEUBERTH.